Feb. 17, 1970 YUKIO MIZUTA ET AL 3,496,341

CARD READING SYSTEM

Filed Dec. 27, 1966 2 Sheets-Sheet 1

INVENTORS
YUKIO MIZUTA
SHIZUYA ANO
KAZUO INOUE
HIROMOTO ODA
BY
ATTORNEYS

Feb. 17, 1970 YUKIO MIZUTA ET AL 3,496,341

CARD READING SYSTEM

Filed Dec. 27, 1966 2 Sheets-Sheet 2

INVENTORS
YUKIO MIZUTA
SHIZUYA ANO
KAZUO INOUE
HIROMOTO ODA

BY

Christensen, Sanborn, & Matthews
ATTORNEYS

United States Patent Office 3,496,341
Patented Feb. 17, 1970

3,496,341
CARD READING SYSTEM

Yukio Mizuta, 68–101 Ninomaru-cho, Mukojima, Fushimi-ku; and Shizuya Ano, 172–9 Uguisudai, Nagaoka-cho, Otokuni-gun, both of Kyoto, Japan; Kazuo Inoue, 1–66 Shinmachi, Higashiyamamoto, Yao, Osaka, Japan; and Hiromoto Oda, 61–4 Kitaichimachi, Nara, Japan Filed Dec. 27, 1966, Ser. No. 604,912
Claims priority, application Japan, Dec. 29, 1965, 40/81,868
Int. Cl. G06k 7/00
U.S. Cl. 235—61.11 6 Claims This invention relates to a card reading system and more particularly to improvements in a system for reading the various informations contained in cards used in various credit sale systems.

In recent years, credit sale systems have achieved a wide acceptance and are used for selling or purchasing various types of service and product. To take an automatic wicket provided at a railway station for example. When a person inserts his or her ticket (credit card) into the slot of the automatic wicket, the information contained in the card is read by a card reader in the machine, so that the wicket bar or something is opened or kept closed, depending upon the validity or invalidity of the card that has been inserted. The information given on such tickets is generally in the form of magnetic inked symbols or characters, punched holes, etc. arranged in accordance with a predetermined pattern or code. If the card is of a rectangular shape, as is generally the case with such cards, and if the slot of the card reader is of a length just long enough to accept the shorter width of the card, the card may be inserted into the slot in four different manners, that is, with one edge of the shorter width forward, or its opposite edge forward, and in either of the two cases, the card may be inserted with its obverse side turned reverse. If the card reader is so arranged that it can read the information on the card only when it is inserted therein a predetermined one of the above four different manners, the card reader does not work if the card is inserted otherwise.

Heretobefore, therefore, it was required that the card be inserted into the card reader in a single predetermined manner and not otherwise, and the cards are provided with some kind of indication on it, such as an arrow mark to enable the users of the card to properly insert it into the machine. This, however, certainly is inconvenient.

Accordingly, the primary object of the invention is to provide a card reading system which is capable of reading the information on the card inserted thereinto, regardless of the manner of inserting the card.

Figure 1:
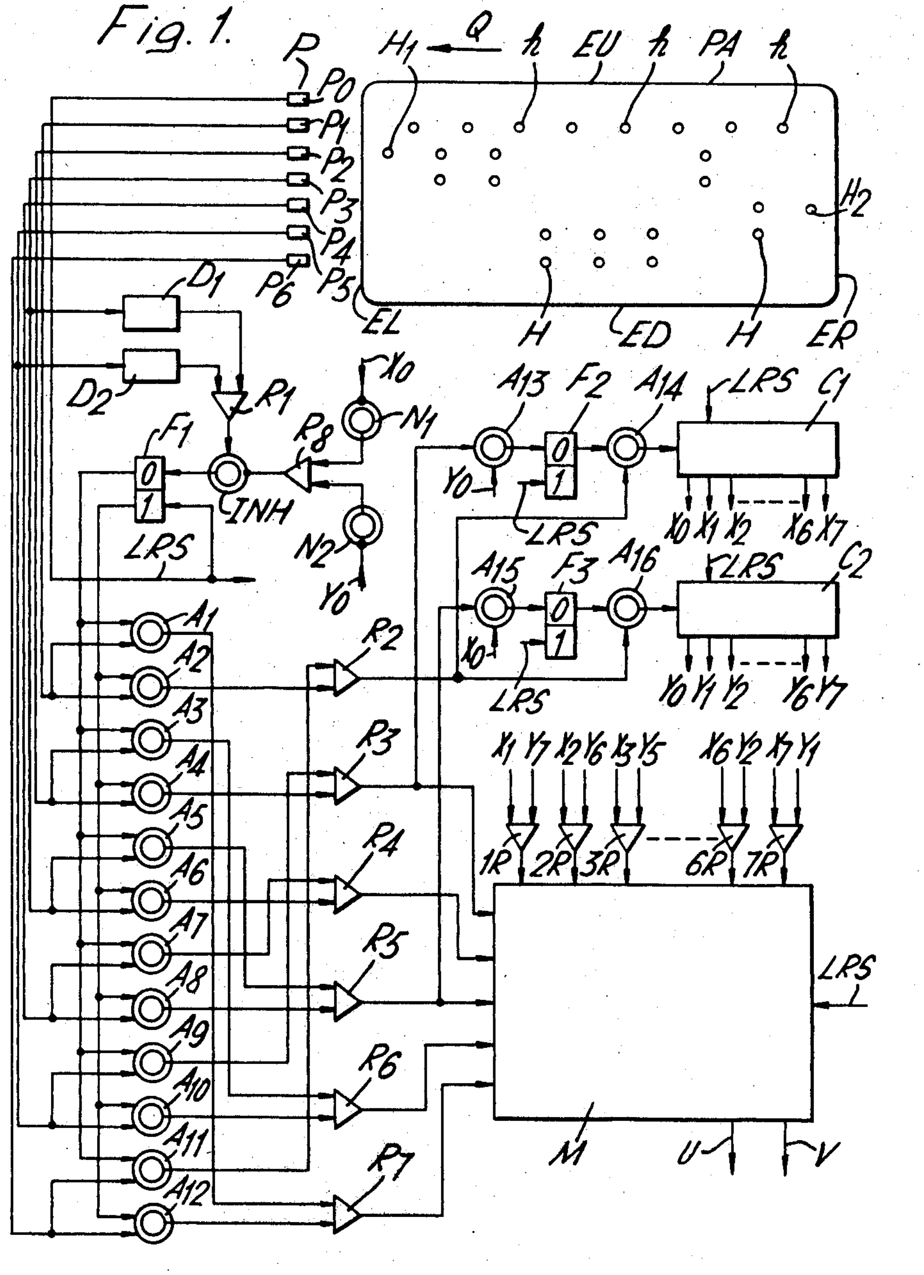
Figure 2:
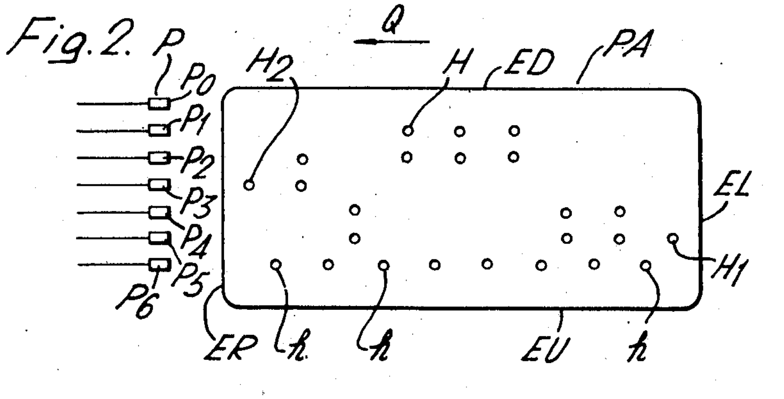
Figure 3:
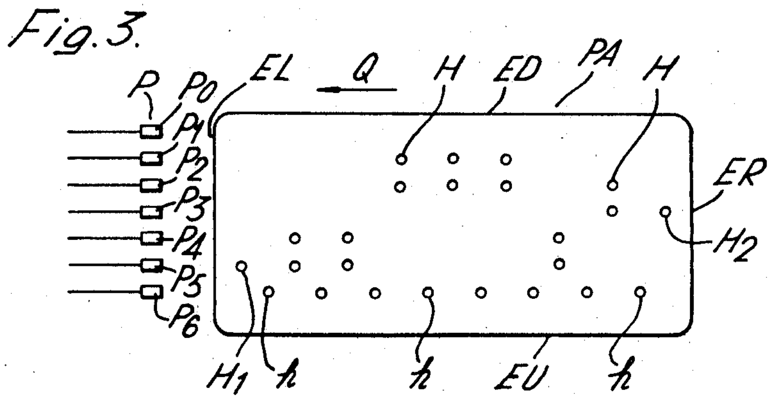
Figure 4:
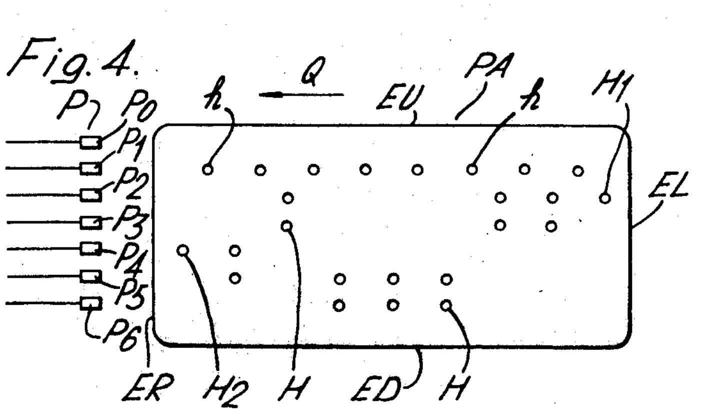

Other objects of the invention will become apparent from the following description with reference to the accompanying drawings, wherein:

FIG. 1 is a circuit diagram of one embodiment of the invention, illustrating the relative position of an inserted card and the detectors; and FIGS. 2 to 4 show the relative position of the detectors and the card inserted in different manners.

Referring to the drawings, there is shown a card PA of a rectangular shape defined by a shorter pair of edges ER and EL and a longer pair of edges EU and ED. The required information is recorded on the card in the form of punched holes arranged in six rows parallel with the longer edges of the card and at seventeen stations in each row. The six rows will be numbered as the first to the sixth row from top to bottom in FIG. 1, and the seventeen stations, as the first to the seventeenth station from left to right successively in the figure.

Seven photodetectors P0 through P6 are arranged in the slot of the machine (not shown) along a line across the card. The holes H1 and H2 are those by which to detect the manner in which the card is inserted. The holes *h* in the first row are guideholes. The holes H in the other five rows, that is, the second to the sixth rows are those by which the informations are recorded in such a manner that two holes at each odd numbered station (excepting the first and seventeenth stations) in two out of the five rows contain a single information in the two out of five code.

As the card is inserted into the slot of the machine, the holes in the first to sixth rows pass the detectors P1 to P6, respectively, but no holes pass the detector P0. Each of the detectors comprises a phototransistor and faces a light source. When each phototransistor receives light from its opposed source, it produces an output. As the card comes in between the detectors and light sources, first the outputs of all the detectors P0 through P6 become "0," and then the output of those detectors which deceive light through the holes become "1." In FIG. 1 before the card is inserted, the outputs of all the detectors P0 through P6 are "1." When the left edge EL of the card comes in, the outputs of all the detectors become "0." Then, the output of the detector P2 which faces the hole H1 becomes "1." Then, the output of the detector P1 which faces the hole *h* at the second station in the first row becomes "1." Thereafter, the output of two of the five detectors P2 through P6 becomes "1" and, alternately, the output of the detector P1 becomes "1." The detector P0 faces no holes and consequently its output remains "0" so long as the card is interposed between the photodetector P0 and its opposed light source. The photodetectors P1 through P6 have their respective outputs connected to each two of AND elements A1 and A2, A3 and A4, A5 and A6, A7 and A8, A9 and A10, and A11 and A12. The output of the detector P0 is connected through a line LRS to the "1" section of a flip-flop F1, the output of which section is applied to the AND elements A1, A3, A5, A7, A9 and A11.

As will be described later, when the card is inserted as shown in FIG. 1 or 4, the flip-flop F1 remains reset, with the output from its "1" section keeping the AND elements A2, A4, A6, A8, A10 and A12 ready to produce an output, while when the card is inserted in the manner shown in FIG. 2 or 3, the flip-flop F1 is set, so that the AND element A1, A3, A5, A7, A9 and A11 are ready to produce an output. An OR element R2 has two input terminals, one of which is connected to the output of the AND element A2 while the other is connected to the output of the AND element A11. In whichever of the previously mentioned four manners the card may have been inserted, the guide holes *h* in the first row are detected by the detector P1 or P6. That is, when the card is inserted in the manner as shown in FIG. 1 or 4, the guide holes on the card are detected by the detector P1. When it is inserted in the manner as shown in FIG. 2 or 3, the guide holes are detected by the detector P6. The output of the detector P1 is applied to one input terminal of the AND element A2, to the other input terminal of which is applied the output of the "1" section of the flip-flop F1. The output of the detector P6 is applied to one input of the AND element A11, to the other input terminal of which is applied the output of the "0" section of the flip-flop F1. Thus, regardless of the manner in which the card is inserted, the AND element A2 or A11 produces one pulse upon detection of every one hole *h* by the detector P1 or P6. OR elements R3 through R7 have their respective two inputs connected to the outputs of each two AND elements A4 and A9, A6 and A7, A8 and A5, A10 and A3, and A12 and A1.

The holes H in the second row are detected by the detector P2 or P5, regardless of the manner in which it is inserted. That is, these holes are detected by the detector P2 when the card is inserted in the manner shown in FIG. 1 or 4, and by the detector P5 when the card is inserted in the manner shown in FIG. 2 or 3. The output of the detector P2 is applied to one input of each of the AND elements A3 and A4, and the output of the detector P5 is applied to one input of each of the AND elements A9 and A10. As previously mentioned, the flip-flop F1 produces an output at its "1" section when the card is inserted in the manner shown in FIG. 1 or 4, and at its "0" section when the card is inserted in the manner shown in FIG. 2 or 3. Consequently, when the card is inserted as shown in FIG. 1 or 4, the AND element A4 produces an output; while when the card is inserted as shown in FIG. 2 or 3, the AND element A9 produces an output. The outputs of the AND elements A4 and A9 are both applied to the OR element R3. Thus, upon detection of each hole in the second row, the OR element R3 produces an output, regardless of the manner in which the card is inserted. In a similar manner, upon detection of each hole in the third, fourth, fifth and sixth rows, the OR elements R4, R5, R6 and R7 produce an output, respectively.

The holes H1 and H2 are punched out at such positions that they are detected by a different one of the detectors P1 through P6 when the card is inserted in different manners.

The outputs of the detectors P3 and P5 are connected to the inputs of OR element R1 through differential circuits D1 and D2, respectively. The output of the OR element R1 is applied to the input of the INHIBIT element INH, the output of which is applied to the "0" section of the flip-flop F1. Thus, under the condition that there is no inhibit signal on the element INH, the flip-flop F1 is set when the detector P3 or P5 detects the hole H2 or H1 in the card.

The output of the OR elements R3 through R7 is applied to a collation-memory circuit M, which has necessary information already memorized therein. The circuit M is also provided with reference input terminals, to which are connected the output terminals of OR elements 1R through 7R, respectively. As will be described later in detatil, as the detector P1 detects the guide holes one by one, the OR element which produces an output is shifted from 1R to 7R successively. While the OR elements 1R through 7R are applying an output to the circuit M, the information signals are simultaneously applied to the circuit M through the OR elements R3 through R7, wherein they are collated with the information already memorized therein. If all the information signals are valid, the circuit M produces an output at a terminal U, while if any of them is invalid, that is, a card inserted is false or invalid, an output appears at another terminal V. The circuit M may comprise a diode-matrix, the arrangement of which is so well known that no detailed explanation will be necessary.

Two pulse counters C1 and C2 have eight output terminals X0 through X7 and Y0 through Y7, respectively. The output terminals X1 through X7 are connected to one input terminal of the OR elements 1R through 7R, respectively, while the output terminals Y1 through Y7 are connected to the other input terminals of the OR element 7R through 1R, respectively, in the reverse order.

The counter C1 has its input terminal connected to the output terminal of an AND element A14, which has one of its two input terminals connected to the output terminal of the OR element R2 and the other connected to the output of the "0" section of a flip-flop F2. An AND element A13 applies its output as a set signal to the flip-flop F2. The flip-flop F2 receives a reset signal through the line LRS. The AND element A13 has one input terminal connected to the output of the OR element R3 and the other input terminal connected to the output terminal Y0 of the counter C2, at which an output appears while the counter is not counting any input pulses. Thus, when the card is inserted in the manner shown in FIG. 1 or 4, the counter C1 receives input pulses as the holes $h$ are detected one by one by the detector P1.

The counter C2 has its input terminal connected to the output terminal of an AND element A16. This AND element has its one input terminal connected to the output of the "0" section of a flip-flop F3 and its other input terminal connected to the output terminal of the OR element R2. The output of an AND element A15 is applied as a set signal to the flip-flop F3, which receives a reset signal through the line LRS. The AND element A15 has its one input connected to the output of the OR element R5 and the other input connected to the output terminal X0 of the counter C1, at which terminal an output appears while the counter C1 is counting no input pulses. Thus, when the card is inserted in the manner shown in FIG. 2 or 3, the counter C2 receives input pulses as the holes $h$ are detected one by one by the detector P6.

The INHIBIT element INH has its inhibit terminal connected to the output terminal of an OR element R8, which has its two input terminals connected to the output terminals X0 and Y0 of the counters C1 and C2 through NOT elements N1 and N2, respectively. Therefore, when either of the counters C1 and C2 starts counting operation, an inhibit signal is applied to the element INH.

In FIG. 1, as the card is inserted into the slot of the machine and continuously moved in the direction Q, its left-hand edge EL first shuts all the detectors off their corresponding light source, whereupon all their outputs become "0." The "0" signal on the line LRS results in removal of the reset signals that have been applied to the flip-flops F1, F2 and F3, the counters C1 and C2, and the circuit M. However, the flip-flop F1 still maintains the output from its "1" section. Under the condition, when the hole H1 in the card is sensed by the detector P2, the AND element A4 produces an output, which is applied through the OR element R3 to one of the two input terminals of the AND element A13. Since the output at the terminal Y0 of the counter C2 is already applied to the other input of the AND element A13, this element produces an output, which sets the flip-flop F2 to produce an output to be applied to one input terminal of the AND element A14. The flip-flop F2 remains set until the card has passed the detectors. Therefore, as the card is further moved into the slot, the hole at the second station in the first row comes in front of the detector P1, whereupon the AND element A2 produces an output to be applied through the OR element R2 to the other input terminal of the AND element A14. As a result, the element A14 produces an output pulse to be applied to the counter C1. In this manner, every time a succeeding one of the holes in the first row in the card is detected by the detector P1, one pulse is applied to the counter C1. When seven pulses have been counted, the terminal X7 produces an output. When the eighth and last hole in the first row has been detected, the eighth output pulse from the AND element A14 removes the output at the terminal X7 of the counter and instead produces an output at the terminal X0 again.

The output at the terminal X1 of the counter C1 is applied as a reference signal to the circuit through the OR element 1R. While this reference signal is being applied to the circuit M, the holes H at the third station in the second and third rows come to be detected by the detectors P2 and P3, whereupon the AND elements A4 and A6 produces an output, which is applied through the OR elements R3 and R4 to the circuit M, where in the presence of the reference signal applied to the circuit M, these information signals are collated with the already memorized information in the circuit M. In like manner, as the card is further moved, the information signals caused by detection of the other information holes H in the card are applied to the circuit M to be collated with the memorized information in the presence of corresponding reference signals applied to the circuit M through the OR elements 2R through 7R.

Upon completion of the above collation, if all the informations on the card are valid, an output appears at the terminal U. On the contrary, if any one of the informations is invalid, an output appears at the other terminal V. If the system is applied to an automatic wicket installed in a railway station, the signal at the terminal U may be utilized to open a normally closed wicket or to keep a normally open wicket open. The signal at the terminal V may be utilized to keep a normally closed wicket closed or to close a normally open wicket.

When the card is inserted in the manner as shown in FIG. 2, the holes in the cards are detected in the order opposite to that in FIG. 1. First, the holes H2 is detected by the detector P3, whereupon the detector produces an output to be applied through the differential circuit D1, the OR element R1 and the INHIBIT element INH to the "0" section of the flip-flop F1 to set the same. The output of the "0" section is applied to one input of each of the AND elements A1, A3, A5, A7, A9 and A11. On the other hand, the output of the detector P3 is applied to the other input of the AND element A5 as well as one input of the AND element A6. As a result, the AND element A5 produces an output, which is applied to the AND element A15. The output of this AND element sets the flip-flop F3 to produce an output to be applied to one input terminal of the AND element A16. In FIG. 2, the guide holes are detected by the detector P6, so that as one guide hole is detected, the AND element A11 produces an output, which is applied through the OR element R2 to the other input of the AND element A16, the output of which is applied to the counter C2. Every time the counter counts one pulse, a signal is applied to the OR elements 7R down to 1R in succession in the order mentioned, which is opposite to that in FIG. 1.

The holes at the fifteenth station in the fourth and fifth rows in FIG. 1 are now detected by the detectors P2 and P3 in FIG. 2. Then, the outputs of the AND elements A3 and A5 and, consequently, those of the OR elements R5 and R6 become "1." It should be recalled that in FIG. 1 when the same holes are detected by the detectors P4 and P5, the outputs of the AND elements A8 and A10 and, consequently, those of the OR elements R5 and R6 become "1." The results are the same in FIGS. 1 and 2. Thus, detection of the same information holes results in production of an output from the same OR elements R3 through R7 whether the card is inserted in the manner shown in FIG. 1 or 2.

When the card is inserted in the manner shown in FIG. 3, the hole H1 is detected by the detector P5. The output produced by the detector is applied to the differential circuit D2, which produces an output to set the flip-flop F1, the output of which is applied to the AND element A9. The output produced by the detector P5 is also applied to the other input of the AND element A9. Then, this AND element produces an output, which is applied to the OR element R3, so that the counter C1 will be ready to operate. It will be easily seen that in FIG. 3, things proceed in the same manner as in FIG. 1. The holes H in the second and third rows in FIG. 1 are, now in FIG. 3, detected by the detectors P5 and P4, so that the AND elements A9 and A7 and, consequently, the OR elements R3 and R4 produce an output. It should be recalled that in FIG. 1, the holes in the second and third rows are detected by the detectors P2 and P3 so that the OR elements R3 and R4 produce an output. The results are the same in FIGS. 1 and 3. The same is true with the information holes in the other rows. Thus, detection of the same holes results in production of an output from the same OR elements R3 to R7, whether the card is inserted in the manner shown in FIG. 1 or 3.

When the card is inserted in the manner shown in FIG. 4, the hole H2 is detected by the detector P4, so that the AND element A8 and, consequently, the OR element R5 produces an output and the counter C2 is ready to be operated as in the case of FIG. 2. The holes in the fourth and fifth rows in FIG. 1 are detected by the detectors P5 and P4 in FIG. 4, so that the AND elements A10 and A8 and, consequently, the OR elements R6 and R5 produce an output. In FIG. 1, the same holes are detected by the same detectors P4 and P5, so that the OR elements R5 and R6 produce an output. The results are the same in FIGS. 1 and 4. The same is true with the holes in the other rows. Thus, detection of the same holes results in production of an output from the same OR elements R3 through R7, whether the card is inserted in the manner shown in FIG. 1 or 4.

It is now believed to have become clear that the invention can accomplish its intended objects. It is understood that the illustrated embodiment is a mere example, and that many changes and modifications may be made without departing from the scope of the invention as defined in the appended claims. For example, a circuit may be designed, in which cards are inserted in only two of the above-mentioned four different manners. Such a circuit will be easily conceivable to those who have read the present specification, so that no explanation will be given.

What we claim is:

1. A card reading system comprising, in combination with cards adapted to be inserted into said system in two predetermined different manners, in one of which they are inserted with their one edge forward, while in the other they are inserted with their opposite edge forward and at the same time their observe turned reverse, each said card having at least one distinguishing mark by which to distinguish between said two manners of insertion, a series of guide marks and a plurality of information marks: means for detecting said marks to produce a distinguishing signal, guide signals and information signals; circuit means provided with guide signal input terminals and information signal input terminals for collating said information signals with predetermined reference information memorized therein beforehand; a first and a second counter each provided with an input terminal to which said guide signals are applied and output terminals at which a signal appears upon counting of every one of said input guide signals, each of said output terminals of said second counter being connected to one of said guide signal input terminals of said circuit means in the reverse order to that in which each of said output terminals of said first counter is connected to one of said guide signal input terminals; and circuit means controlled by said distinguishing signal to alternatively render said first and second counters operative.

2. The system as defined in claim 1, wherein said marks are punched holes and said detecting means are phototransistors.

3. A card reading system comprising, in combination with cards adapted to be inserted into said system in two predetermined different manners, in one of which they are inserted with their one edge forward, while in the other they are inserted with the same one edge forward but their obverse turned reverse, each said card having at least one distinguishing mark by which to distinguish between said two manners of insertion, a series of guide marks and a plurality of information marks; means for detecting said marks to produce a distinguishing signal, guide signals and information signals; first circuit means provided with guide signal input terminals and information signal input terminals for collating said information signals with predetermined reference information memorized therein beforehand; a pulse counter receiving said guide signals to produce output signals to be successively applied to said guide signal input terminals of said first circuit means; second circuit means for applying each of said information signals to a corresponding one of said information signal input terminals when each said card is inserted in one of said two manners; third circuit means for applying each of said information signals to said same corresponding one of said information signal input terminals when each said card is inserted in the other of said two manners; and means controlled by said distinguishing signal to switch from each of said second and third circuit means to the other.

4. The system as defined in claim 3, wherein said marks are punched holes and said detecting means are phototransistors.

5. A card reading system comprising, in combination with cards adapted to be inserted into said system in four predetermined different manners, in one of which they are inserted with one edge forward, in a second of which they are inserted with their opposite edge forward, in a third of which they are inserted with said one edge forward but at the same time their obverse turned reverse, and in the fourth of which they are inserted with said opposite edge forward and at the same time their obverse turned reverse, each said card having at least a pair of distinguishing marks by which to distinguish said four different manners, a series of guide marks and a plurality of information marks: means for detecting said marks to produce distinguishing signals, guide signals and information signals; first circuit means provided with guide signal input terminals and information signal input terminals for collating said information signals with predetermined reference information memorized therein beforehand; first and second pulse counters each provided with an input terminal to which said guide signals are applied and output terminals at which an output appears upon counting of every one of said input guide signals, each of said output terminals of said second counter being connected to one of said guide signal input terminals of said first circuit means in the reverse order to that in which each of said output terminals of said first counter is connected to one of said guide signal input terminals; second circuit means for applying each of said information signals to a corresponding one of said information signal input terminals of said first circuit means when each said card is inserted in said first and fourth manners of insertion; third circuit means for applying each of said information signals to said same corresponding one of said information signal input terminals when each said card is inserted in said second and third manners of insertion; means controlled by said distinguishing signals to render operative said first counter when each of said card is inserted in said first and third manners of insertion, and said second counter when each said card is inserted in said second and fourth manners of insertion; and means controlled by said distinguishing signals to switch from each of said second and third circuit means to the other.

6. The system as defined in claim 5, wherein said marks are punched holes and said detecting means are phototransistors.

References Cited

UNITED STATES PATENTS

| | | | |
|---|---|---|---|
| 2,288,770 | 7/1942 | Armbruster | 235—61.12 |
| 2,706,599 | 4/1955 | Smith | 235—61.11 |
| 3,408,483 | 10/1968 | Zuse | 235—61.11 |

DARYL W. COOK, Primary Examiner